United States Patent [19]

Cronin

[11] Patent Number: 4,957,575
[45] Date of Patent: Sep. 18, 1990

[54] TREAD APPLICATION METHOD AND APPARATUS

[75] Inventor: Robert A. Cronin, Irvine, Calif.

[73] Assignee: The Goodyear Tire & Rubber Company, Akron, Ohio

[21] Appl. No.: 332,252

[22] Filed: Mar. 31, 1989

[51] Int. Cl.⁵ .......................................... B29D 30/58
[52] U.S. Cl. ...................................... 156/126; 156/96; 156/128.1; 156/406.2; 156/406.6; 156/421.8
[58] Field of Search ............... 156/421.8, 406.6, 406.2, 156/405.1, 128.1, 128.6, 421.6, 129, 96, 229, 95, 413, 583.91, 126, 394.1

[56] References Cited

U.S. PATENT DOCUMENTS

| | | | |
|---|---|---|---|
| 1,162,425 | 11/1915 | Wilcox | 156/421 |
| 2,936,813 | 5/1960 | Haase | 156/421.8 X |
| 3,212,951 | 10/1965 | Porter | 156/421.8 |
| 3,815,651 | 6/1974 | Neal | 152/187 |
| 3,976,532 | 8/1976 | Barefoot | 156/405 |
| 4,036,677 | 7/1977 | Maranzoni | 156/394 |
| 4,088,521 | 5/1978 | Neal | 156/96 |
| 4,626,300 | 12/1986 | Barefoot | 156/96 |

Primary Examiner—Michael W. Ball
Assistant Examiner—Geoffrey L. Knable
Attorney, Agent, or Firm—David L. King

[57] ABSTRACT

A method of clamping an annular tread to a pneumatic tire casing comprises mounting the casing on a wheel, mounting the annular tread on a tread expander assembly. The assembly expands radially and stretches the tread to a size allowing the tread to circumferentially surround the casing. The stretched annular tread then is moved axially toward the casing to a position where it circumferentially surrounds and is centered on the casing. The casing and stretched tread is encircled with a clamping assembly and, with use of such assembly and without rotating the casing or tread relative to such clamping assembly, the stretched, annular tread is clamped to the casing at a number of points. Pads in the clamping assembly then are retracted, and the annular tread is transferred from the supporting device onto the casing by moving the supporting device axially away from the casing.

14 Claims, 9 Drawing Sheets

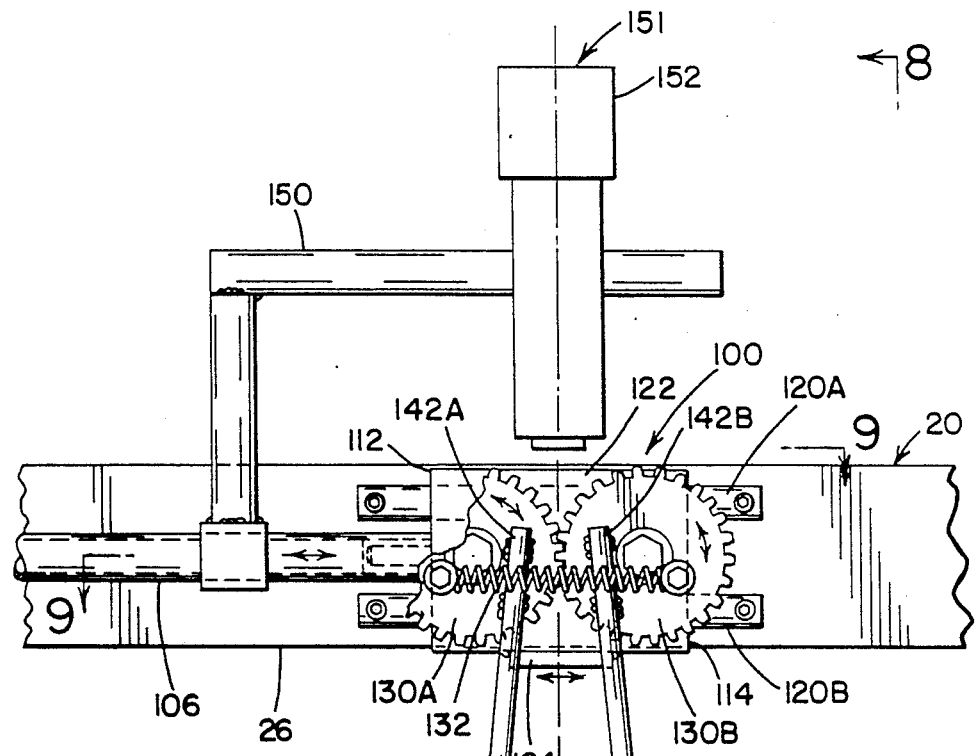
FIG. 7
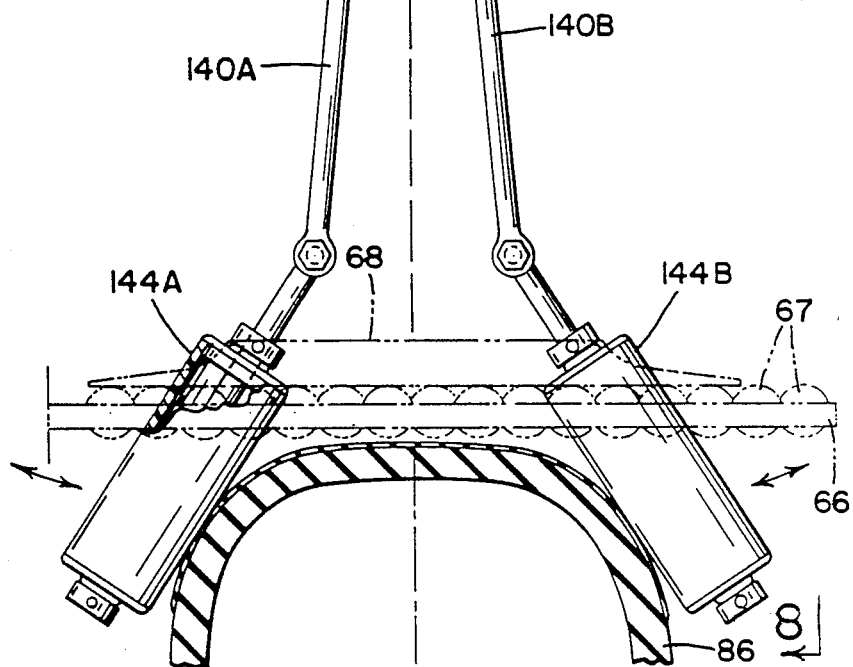

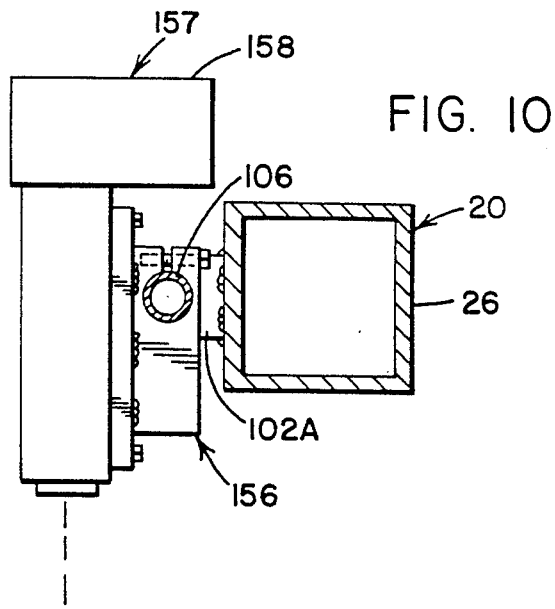
FIG. 10
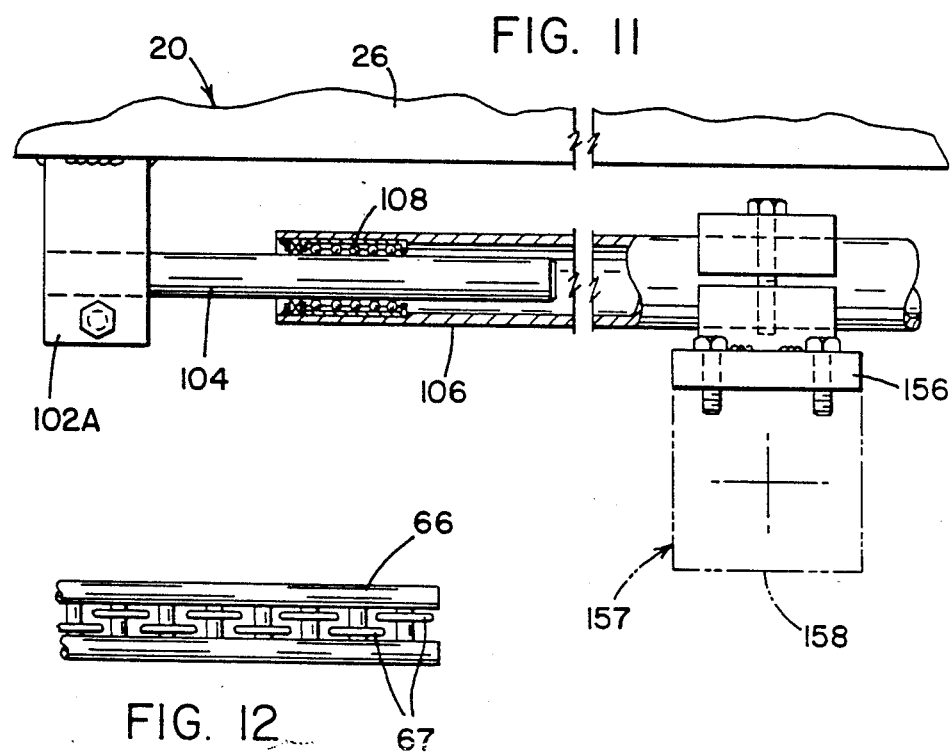
FIG. 11
FIG. 12

TREAD APPLICATION METHOD AND APPARATUS

BACKGROUND OF THE INVENTION

1. Field of Invention

The present invention relates generally to a method and apparatuses for applying an endless, annular tread to a tire casing, and more specifically to a method requiring and an apparatus capable of clamping such annular tread on such casing.

2. Description of the Related Art

An endless, annular tread similar to the type utilized in the present invention is disclosed in U.S. Pat. No. 3,815,651 to Neal. An annular tread as disclosed in Neal is endless, i.e. the circle of the tread is unbroken. A second patent issued to Neal, U.S. Pat. No. 4,088,521, discloses another annular tread which features shoulder wings.

Annular treads, such as these disclosed in the Neal Patents, have a relaxed diameter less than the inflated diameter of the tire casing. The annular treads must be stretched radially outwardly to be fitted over the tire casing. Machinery directed to this process is disclosed in U.S. Pat. No. 3,976,532 to Barefoot and U.S. Pat. No. 4,036,677 to Marangoni. The operation of the machine disclosed in FIG. 1 is similar to the machine disclosed in U.S. Pat. No. 3,976,532 to Barefoot. Details of elements of the tread applying machine disclosed in FIG. 1 which are not essential to the present invention have been only briefly discussed. Additional information regarding the operation of such machines may be found in the Barefoot Patent.

In order to achieve good tire performance, it is important that the annular tread be accurately centered on the tire casing. It is also important that the annular tread is applied to the casing so that the tread stays firmly centered on the casing during the withdrawal of the stretching means and throughout the remainder of the building process. The present invention is a method of clamping an annular tread to a tire casing after it has been accurately positioned on the tire casing.

SUMMARY OF THE INVENTION

A method for clamping an annular tread to a pneumatic tire casing according to the present invention comprises mounting a casing on a wheel, mounting the annular tread on a tread expander assembly, the tread expander assembly being movable along a line coincident with or parallel to the wheel rotational axis, the tread expander assembly having means expandable outwardly and retractable inwardly along the radial direction of the wheel for selectively stretching the tread by radially outward displacement of the tread at a number of spaced points on the radially inner side of the tread. The tread expander stretches the tread by radially expanding the stretching means to a size allowing it to circumferentially surround the casing. The expander assembly moves the stretched, annular tread axially toward the casing to a position where it circumferentially surrounds and is centered upon the casing. Encircling the casing and the stretched tread with a clamping assembly and, using such assembly and without rotating the casing or tread relative to such clamping and assembly, clamps the stretched, annular tread to the casing by pressing the radially outermost surface of the annular tread with a clamping means. The clamping means then is retracted and the annular tread is transferred from the supporting device onto the casing by moving the supporting device axially away from the casing.

BRIEF DESCRIPTION OF THE DRAWINGS

Other aspects of the invention will become apparent from the following description when read in conjunction with the accompanying drawings wherein:

FIG. 7 is a front view of a portion of the centering apparatus shown in FIG. 1:

FIG. 10 is a side cross-sectional view of a portion of the apparatus taken on line 10—10 of FIG. 7;

FIG. 11 is a plan cross-sectional view of another aspect of the centering apparatus taken on line 11—11 of FIG. 1;

FIG. 12 is a plan view of the wheels on the fingers taken on line 12—12 of FIG. 1.

DETAILED DESCRIPTION OF THE PREFERRED EMBODIMENT

The invention also may be better understood in the context of the following definitions, which are applicable to both the specification and the appended claims.

"Axial" is used herein to refer to lines or directions that are parallel to the axis of rotation of the casing or wheel.

"Bead" means that part of the casing comprising an annular tensile member wrapped by ply cords and shaped, with or without other reinforcement elements such as flippers, chippers, apexes, toe guards and chafers, to fit the design rim.

"Casing" means the carcass, belt structure, beads, sidewalls, and all other components of the tire excepting the tread and undertread. The casing may be new, unvulcanized rubber or previously vulcanized rubber to be fitted with a new tread.

"Equatorial plane (EP)" means the plane perpendicular to the casing's axis of rotation and passing through the center of its crown area.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the casing or wheel.

"Sidewall" means that portion of a tire between the tread and the bead.

"Tread" means a molded rubber component which, when bonded to a tire casing, includes that portion of the tire that comes into contact with the road when the tire is normally inflated and under normal load.

"Tread width" means the arc length of the tread surface in the axial direction, that is, in a plane passing through the axis of rotation of the tire.

Figure 1:
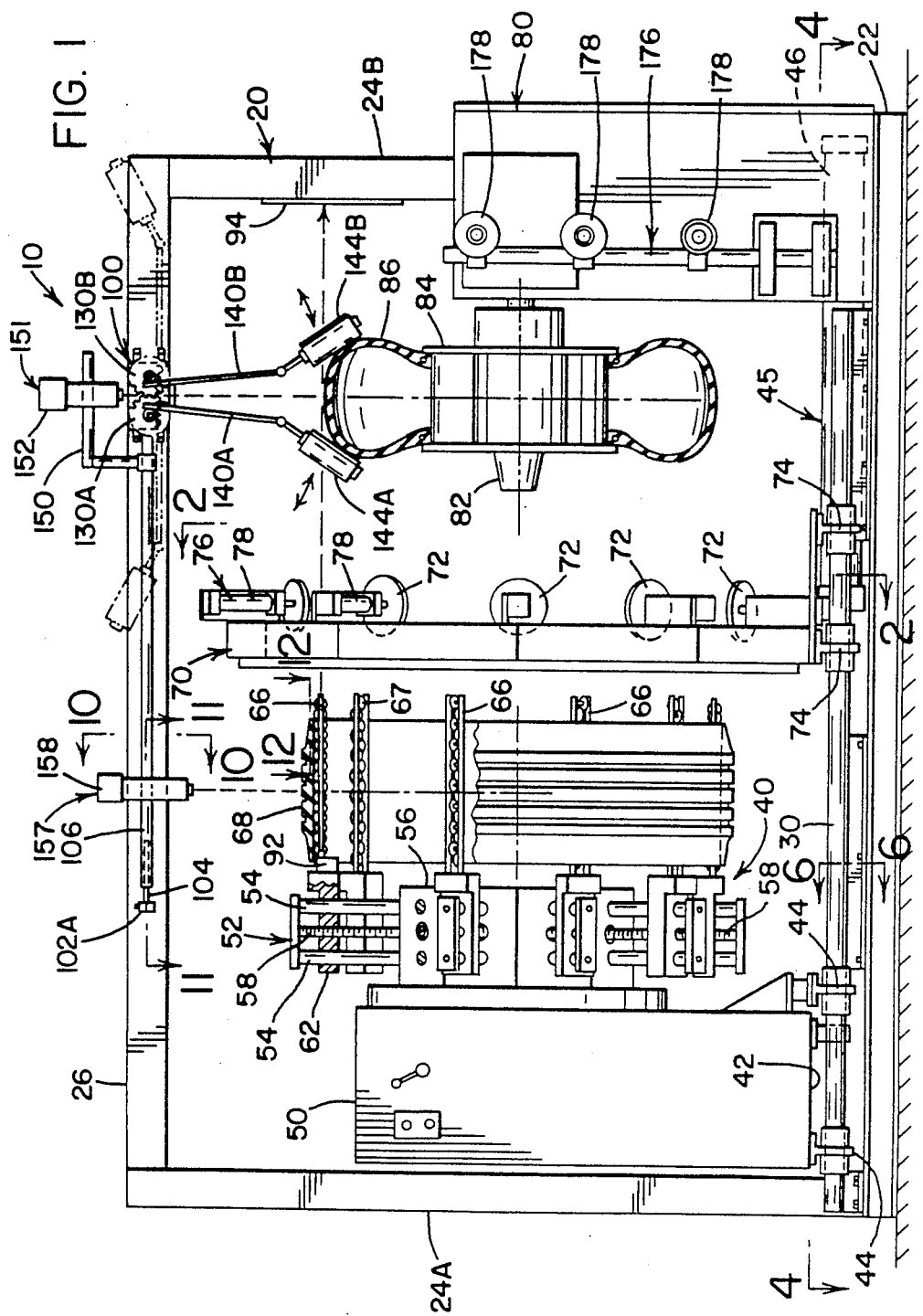
FIG. 1 is a front view of a machine for applying an annular tread to a tire casing.

In the drawings, the same numerals are used for the same components or items in the several views. With particular reference now to FIG. 1 there is illustrated a tread applying machine 10. This tread applying machine is made up of several subcomponents or elements. These elements are supported by a frame 20. The frame may be constructed of any material with sufficient strength and rigidity to support the weight and operation of the tread applying machine. In the preferred embodiment, the frame comprises a horizontal base 22, a pair of vertical side members 24A, 24B fixedly attached to the horizontal base member, and a horizontal top member 26, each end of which is fixedly attached to the vertical side members. In the preferred embodiment, the frame consists of tubular steel members of square cross-section as seen in FIG. 4.

Figure 4:
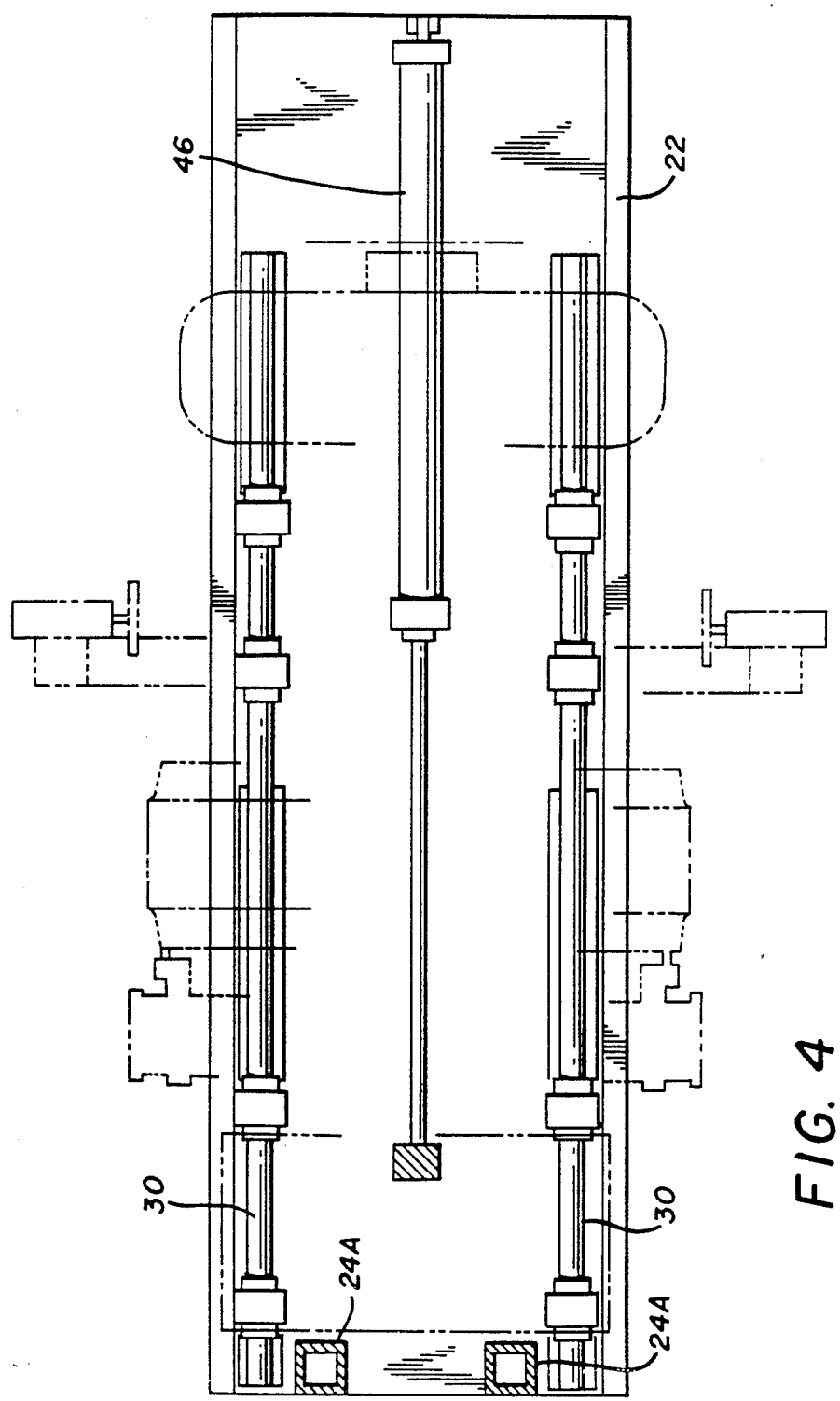
FIG. 4 is a cross-sectional plan view taken on line 4—4 of FIG. 1 with some elements of the machine removed so as to better show the base of frame and the guide rails.
Figure 6:
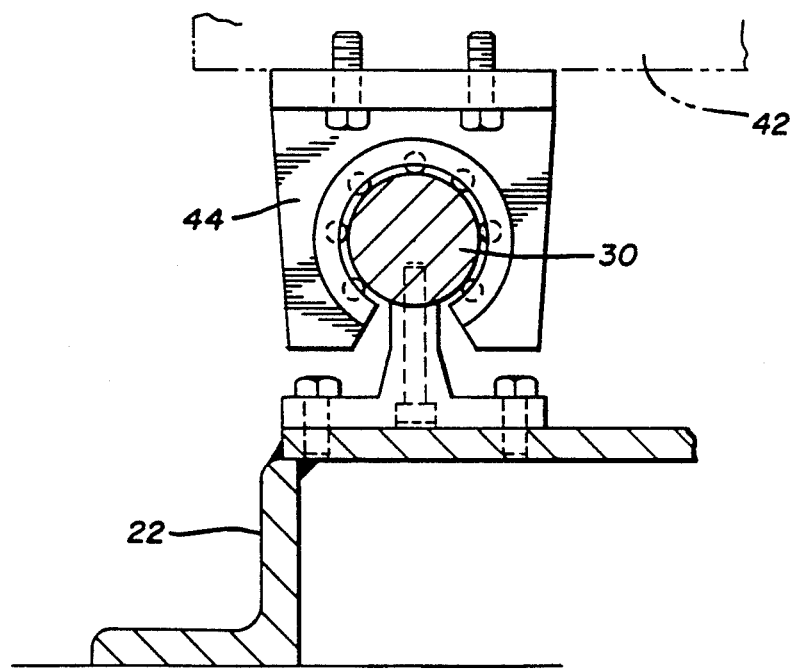
FIG. 6 is a cross-sectional side view of the frame and the guide rails taken on line 6—6 of FIG. 4.

With reference to FIG. 4 and FIG. 6, a pair of guide bars 30 are fixedly attached to the horizontal base 22. Some elements of the tread applying machine which will be discussed later in this specification are slidably mounted on the guide bars.

With reference to FIG. 1, one of these elements, the tread expander assembly, generally indicated by the reference number 40, is slidably mounted for lateral movement along the guide bars 30. The tread expander assembly acts as a supporting device on which to mount the annular tread 68. The tread expander assembly includes a bottom plate 42 which has bearing members 44 downwardly depending from it. As seen best in FIG. 4 and FIG. 6, the bearing members receive the guide bars 30. A means to provide lateral movement 45 is mounted on the base 22 and is connected to the bottom plate of the tread expander assembly. The means to provide lateral movement enables the tread assembly to move axially along the guide bars. In the preferred embodiment, the means to provide lateral movement is a hydraulic cylinder 46.

With reference to FIG. 1, a first cabinet 50 rises from the bottom plate 42 and contains supporting means and means to provide rotational movement, not shown. A shaft, not shown, is mounted on the supporting means and is connected to the means to provide rotational movement. The head assembly 52 is mounted on the shaft. The means to provide rotational movement may selectively turn the shaft and thereby the head assembly.

With reference to FIG. 1, the head assembly 52 has a hub 56 from which extend radially outwardly a plurality of pairs of radially extending rods 54. A threaded shaft 58 is positioned between pairs of radially extending rods. A supporting plate 62 receives the radially extending rods and has a threaded bore which receives the threaded shaft 58. Through an electric motor and bevel gear arrangement not shown, the threaded shafts may selectively provide radial movement to the supporting plates.

With reference to FIG. 1 and FIG. 12, fingers 66 are fixedly mounted to the supporting plate 62 and support the annular tread 68. The fingers feature wheels 67 which allow the stretched tread to be more easily removed from the fingers. In the preferred embodiment, the wheels are slightly offset from the centerline of the fingers radially outwardly toward the casing. This prevents the axially outermost edges of the tread from contacting the finger. By keeping the tread edges on the wheels, the edges are prevented from tucking under and trapping air under the tread. Through the gearing arrangement not shown, the threaded shafts can move the supporting plates 62 and fingers 66 radially outward, thereby stretching the annular tread 68. Alternatively, the gearing arrangement, through the threaded shafts, may radially retract the supporting plates and fingers and thereby relax the annular tread. The amount of radial travel by the fingers, and thereby the amount of stretching by the tread, is regulated by a photo eye 92 and reflective tape 94. The photo eye and reflective tape are positioned so that light emitting from the photo eye can be reflected as soon as the annular tread is stretched sufficiently to encircle the casing. In such case, the reflected light enters the photo eye and signals the electric motor to stop, thereby halting the radial movement of the fingers.

Figure 2:
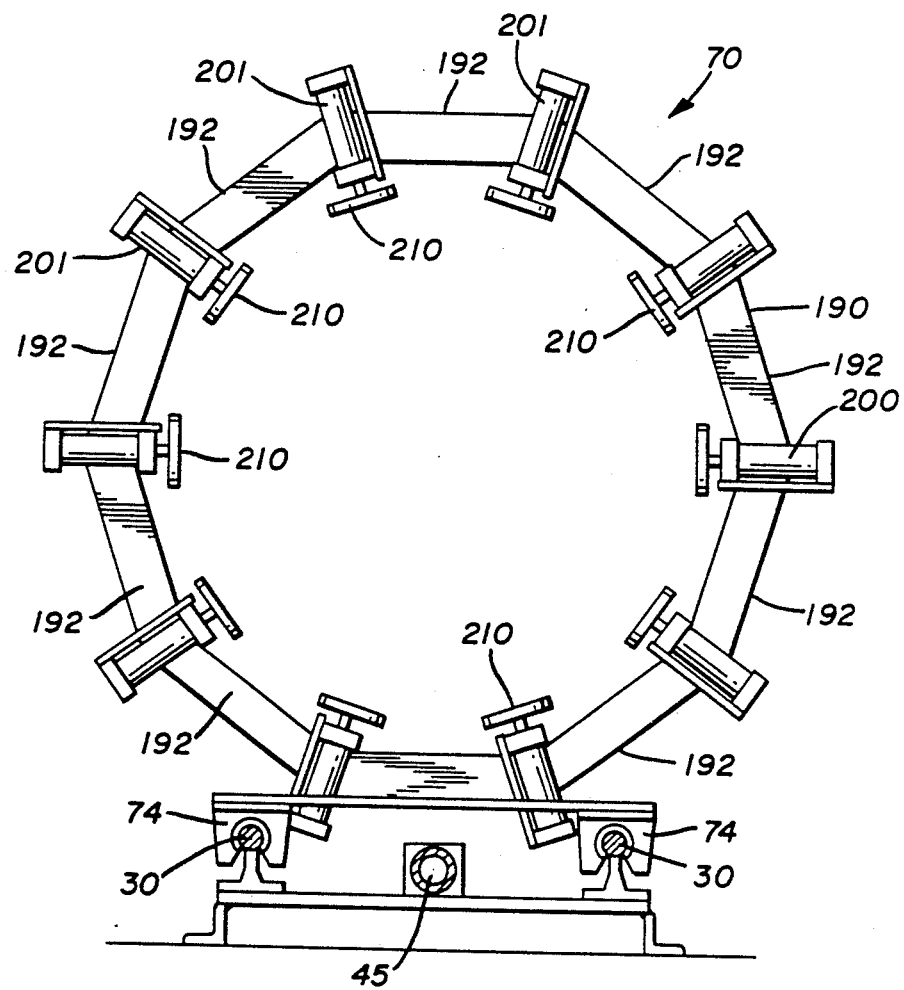
FIG. 2 is an enlarged side view of the clamping apparatus of the present invention taken on line 2—2 of FIG. 1.

With reference to FIG. 1 and FIG. 2, a clamping means 70 is slidably mounted on the guide bars 30. The clamping means is slidably mounted on the guide bar via bearing members 74. The clamping means comprises the clamping assembly frame 190, a plurality of means to generate linear movement 200, and a plurality of pads 210 associated with the means to generate linear movement.

The clamping assembly frame 190 is made up of a plurality of linear segments 192 arranged in a circular form. In the preferred embodiment the clamping assembly frame consists of ten such segments which is equal to the number of fingers on the expander.

At the juncture of the linear segments 192 are mounted means to generate linear movement 200. In the preferred embodiment the means to generate linear movement is pneumatic cylinders 201.

Figure 3:
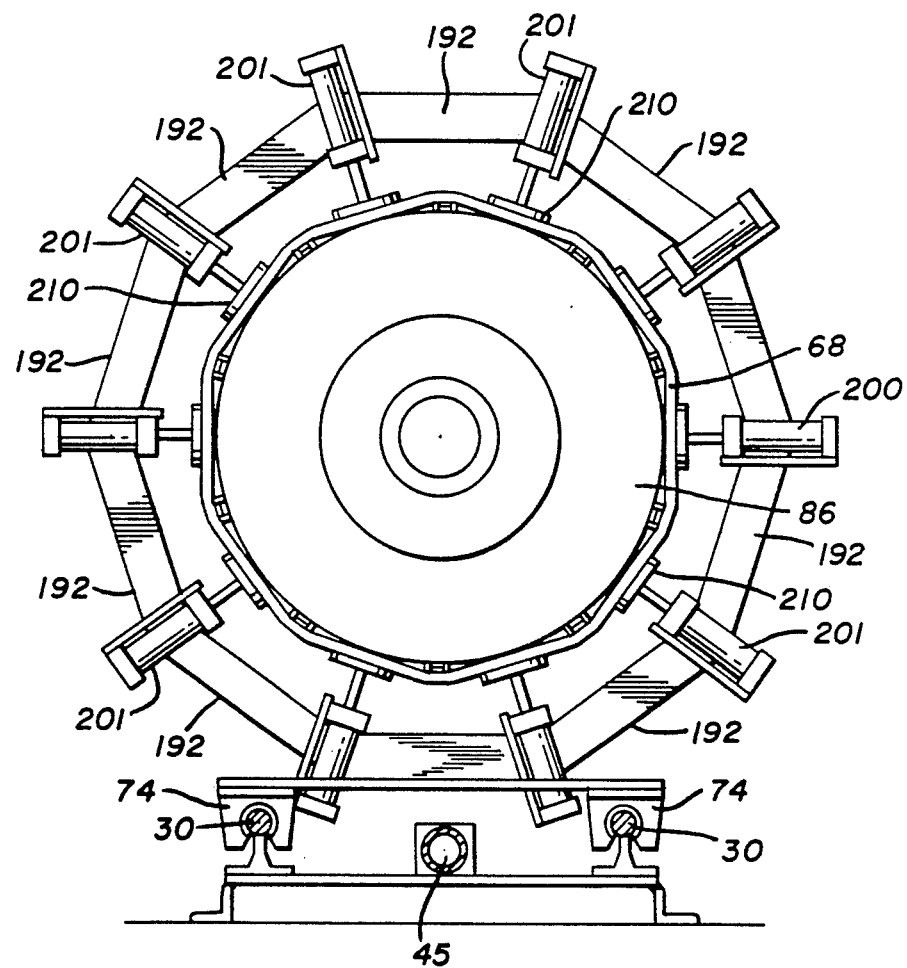
FIG. 3 is a side view of the apparatus shown in FIG. 2 with the pads extended and pressing an annular tread against a casing.
Figure 5:
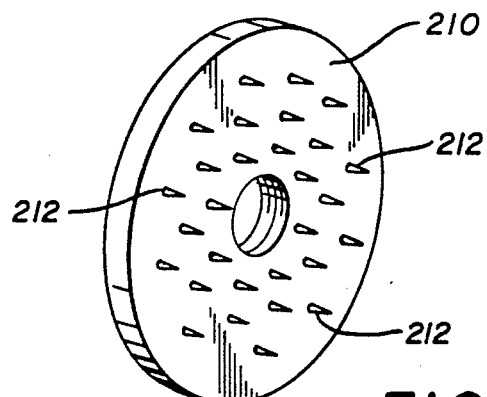
FIG. 5 is a perspective view of an alternate embodiment of a pad of the apparatus shown in FIG. 2.

Mounted on the radially innermost end of each pneumatic cylinders 201 is a pad 210. The pads are selectively extendable radially inwardly against the radially outermost surface of the tread. If desirable, the pads can be equipped with spikes 212 as seen in FIG. 5. In the preferred embodiment, the pads do not feature spikes. The pads impact the tread surface between the points where stretching force is applied via the fingers 66. This is seen best in FIG. 3. In the preferred embodiment, the pads impact the tread surface midway between points where stretching force is being applied.

A second cabinet 80 contains a supporting means and a means to provide rotational movement. A hub 82 is supported by the supporting means and is selectively rotated by the means to provide rotational movement. The hub is adapted to receive and mount a wheel 84 which in turn is adapted to receive a tire casing 86. In the preferred embodiment, the hub 82 is adapted to receive a variety of wheel sizes.

With reference to FIG. 1 and FIGS. 7 through 11, a tread centering assembly 100 is mounted on the horizontal top member 26 via braces 102A-E. With reference to FIG. 11, a rod 104 is attached to brace 102A and extends axially therefrom in a direction generally parallel to the horizontal top member 26. A first end of an inextensible sliding rod 106 fits over the rod 104 and is slidably supported thereby via bearings 108.

Figure 8:
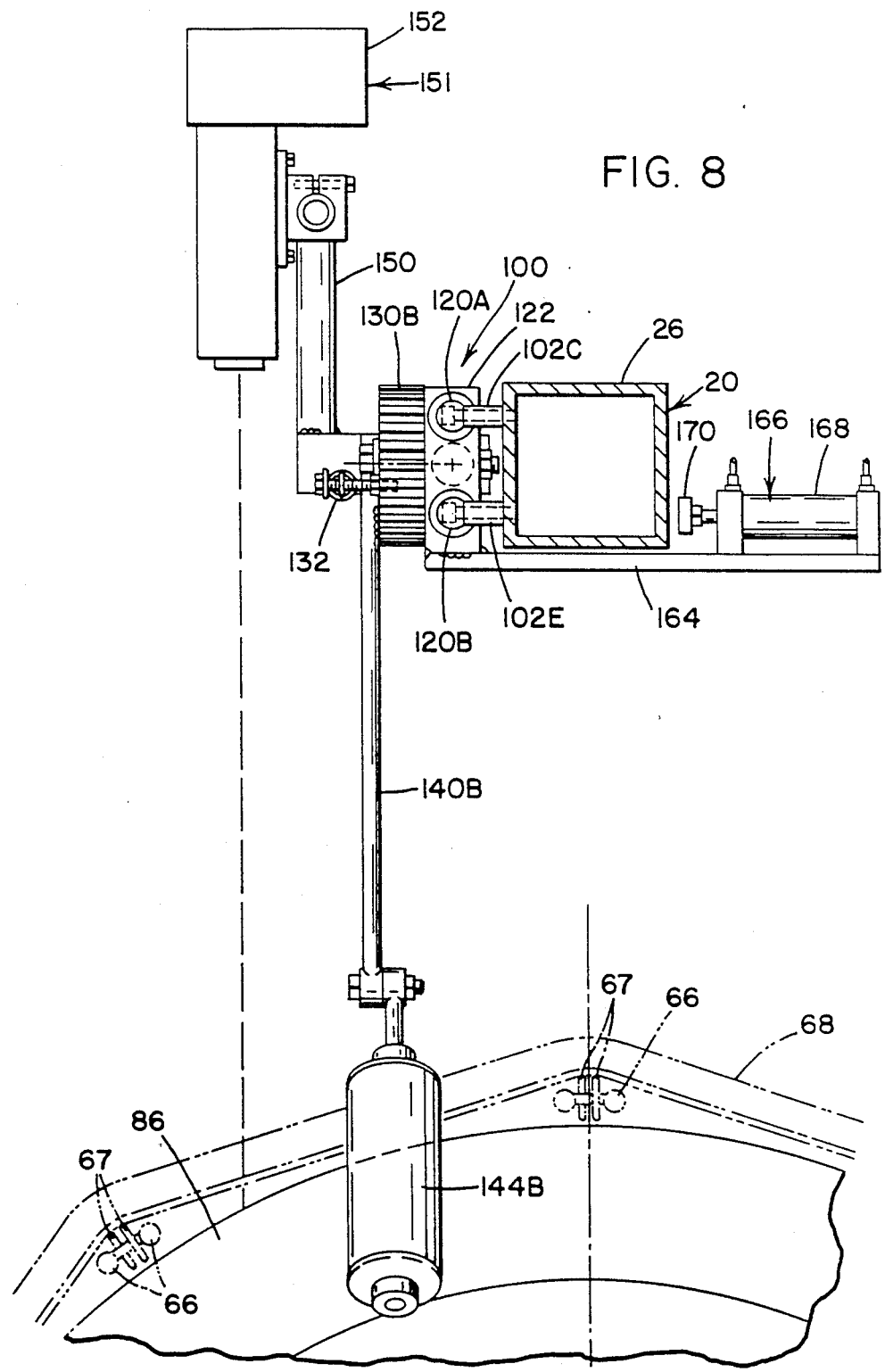
FIG. 8 is a side cross-sectional view of the apparatus taken on line 8—8 of FIG. 7.
Figure 9:
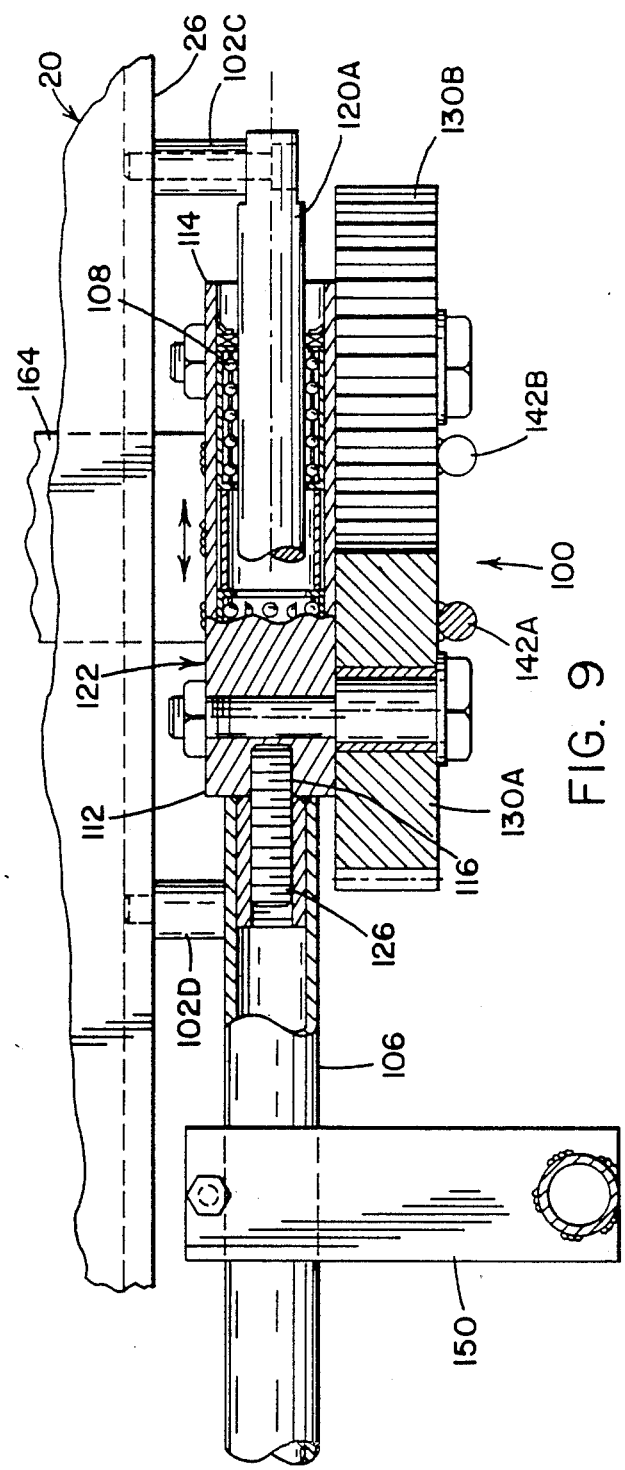
FIG. 9 is an enlarged cross-sectional plan view of the apparatus taken on line 9—9 of FIG. 7

As seen best in FIGS. 8 and 9, the braces 102B–E are located near the second end of the inextensible sliding rod 106. Brace 102B is fixedly attached to the first end of supporting rod 120A. Brace 102C is fixedly attached to the second end of supporting rod 120A. Likewise, brace 102D is fixedly attached to first end of supporting rod 120B and brace 102E is fixedly attached to the second end of supporting rod 120B.

A plate 122 has a pair of bores through it and is adapted to receive supporting rods 120A, 120B. With reference to FIG. 9, a first end 112 of the plate 122 has a threaded bore 116 adapted to receive one end of a threaded rod 126. The other end of the threaded rod is attached to the second end of the sliding rod 106. Through this threaded connection, the sliding rod and plate move as a unit.

The range of lateral sliding movement is equal to the distance between braces 102B and 102C, minus the lateral distance between the first end 112 and the second end 114 of the plate 122. Lateral movement is stopped when first end 112 of the plate 122 touches braces 102B, 102D and when second end 114 of the plate touches braces 102C, 102E.

With the reference to FIGS. 1 and 7, a pair of intermeshed circular gears 130A,130B are rotatably mounted to plate 122. An off center spring 132 extends between the gears and is attached to them. A pair of axially spreadable arms 140A, 140B extends downwardly from each gear toward the casing. Each first end 142A, 142B of the arms is attached to a gear. At the second end of each arm is mounted a roller 144A, 144B. The arms move between a first position, in which they extend downwardly toward the casing, and a second position, in which the arms are locked into position when approximately parallel to horizontal top member 26.

With reference to FIG. 8, a plate 164 is attached, preferably by welding, to plate 122. A means to prohibit lateral sliding movement 166 is mounted on plate 164. In the preferred embodiment, this means is a pneumatic cylinder 168 and piston 170. When the cylinder is activated, the piston extends and contacts the horizontal top member 26. The friction between the piston and the horizontal top member prohibits sliding movement.

With reference to FIG. 9, a first bracket 150 is fixedly mounted to sliding rod 106. A means to project a marking medium 151 is attached to the first bracket 150. In a preferred embodiment, the means to project a marking medium is a centerline light 152.

With reference to FIGS. 10 and 11, a second bracket 156 is fixedly mounted to the sliding rod 106. A second means to project a marking medium 157 is mounted on the second bracket 156. In the preferred embodiment, the second means to project a marking medium is a second centerline light 158.

With reference to FIG. 1, a let-off 176 is mounted on the base 22. The let-off has a plurality of spools 178 which may let-off or windup sheets of material such as unvulcanized rubber.

The components herein recited work together to clamp an annular tread to a pneumatic tire casing in the following manner.

A casing 86 is mounted on an appropriate wheel 84. In the case of a previously vulcanized casing, the surface of the casing has already been buffed and prepared appropriately and a thin layer of unvulcanized rubber is manually applied to the surface of the casing via the let-off 176. Next the casing is partially inflated to about 18 psi.

The arms 140A, 140B and rollers 144A, 144B are brought down to their first position with the rollers touching the edges of the crown of the casing. At this time, the piston 170 is not contacting the horizontal top member 26, therefore, the tread centering assembly 100 is free to slide axially via the sliding rod 106. When the arms touch the casing at corresponding points of the casing surface on opposite sides of the equatorial plane, the first centerline light 152 is coincident with the equatorial plane of the casing. At this point, the cylinder 168 is activated so that the piston 170 contacts the horizontal top member 26 and prohibits sliding movement of the sliding rod 106. The arms 140A, 140B and the rollers 144A, 144B are next manually moved to the second position where the arms are approximately parallel with the horizontal top member 26. This is best seen in FIG. 1.

The second centerline light 158 is mounted on the sliding rod 106 so that the plane defined by light emitting from the second centerline light is parallel to the equatorial plane of the casing and is located a specific distance from it. This specific distance is exactly equal to the travel of the hydraulic cylinder 46.

An annular tread 68 is mounted on the relaxed fingers 66. The tread is approximately centered under the second centerline light 158. The head assembly 52 is rotated slowly and the tread centerline is manually axially adjusted to coincide with the light projected from the second centerline light. Next the gear arrangement not shown causes the threaded shafts to rotate, moving the fingers radially outwardly. This stretches the annular tread and inhibits lateral movement of the tread on the fingers. The fingers move radially outwardly until light from the photo eye 92 reflects from the reflective tape 94. At this point, the tread has been sufficiently stretched to encircle the casing.

The hydraulic cylinder 46 is activated so that the tread expander assembly 40 is pulled toward the casing 86. The tread expander assembly pushes the clamping means 70 ahead of it. When the tread expander assembly 40 has traveled the full stroke of the hydraulic cylinder 46, the tread 68 on the fingers 66 encircles the casing 86. This is seen best in FIG. 3 and FIG. 8. Furthermore, the clamping means 70 encircles the tread 68. The tread is now perfectly centered over the crown area of the casing.

The fingers 66 are now moved radially inwardly, relaxing the tread slightly. The pneumatic cylinders 201 are activated, causing the pads 210 of the clamping means 70 to travel radially inwardly, pushing on the radially outermost surface of the tread and pushing the annular tread against the unvulcanized rubber on the casing surface. This step is important in that the tread must remain accurately centered on the casing as the fingers are withdrawn. Next the pads are retracted. If desired, the pads may be activated and retracted again. Next the hydraulic cylinder 46 is again activated, causing the tread expander assembly 40 to withdraw axially, transferring the tread to the casing by allowing it to roll off the fingers 66 via wheels 67. The clamping means 70 is withdrawn. Finally, the annular tread 68 is stitched down onto the casing surface. The stitching mechanism is not shown.

In another, unpreferred embodiment of the invention, the tread expander assembly 40 withdraws axially while the pads 210 are pushing against the tread surface. In another unpreferred embodiment, the fingers 66 are not partially radially retracted to partially relax the annular tread before the tread is clamped to the casing.

Based on the foregoing description of the invention, what is claimed is:

1. A method for clamping an annular tread to a pneumatic tire casing, the method comprising the steps of:
   mounting the casing on a wheel;
   mounting the annular tread on a tread expander assembly, the tread expander assembly being movable along a line coincident with or parallel to the wheel rotational axis, the tread expander assembly having means expandable outwardly and retractable inwardly along the radial direction of the wheel for selectively stretching the tread by radially outward displacement of the tread at a number of spaced points on the radially inner side of the tread, thereby to expand the tread to a size sufficient to circumferentially surround the casing;
   moving the tread axially toward the casing to a position where the stretched, annular tread circumferentially surrounds and is centered on the casing;
   encircling the casing and stretched tread with a clamping assembly, the clamping assembly having a plurality of spaced clamping means and, using such assembly and without rotating the casing or tread relative to such clamping assembly, clamping the stretched tread to the casing by sequentially or simultaneously pressing on the radially outwardmost surface of the tread at spaced clamping points, each clamping point being located between points where stretching force is applied;
   unclamping the stretched tread at the clamping points; and
   transferring the annular tread from the tread expander assembly onto the casing by moving the tread expander assembly axially away from the casing.

2. A method for clamping an annular tread to a casing, as in claim 1, further comprising the step of:
   radially inwardly displacing the tread expander assembly partially to relax the annular tread.

3. A method for clamping an annular tread to a casing as in claim 2, the clamping occurring after the tread expander assembly is radially displaced inwardly.

4. A method for clamping an annular tread to a casing as in claim 1, further comprising the step of:
   prior to retracting the clamping means, moving the tread expander assembly axially away from the casing to relieve radial stresses imposed on the annular tread.

5. A method for clamping an annular tread to a casing as in claim 2, further comprising the step of:
   prior to retracting the clamping means, moving the tread expander assembly axially away from the casing to relieve radial stresses imposed on the annular tread.

6. A method for clamping an annular tread to a casing as in claim 3, further comprising the step of:
   prior to retracting the clamping means, moving the tread expander assembly axially away from the casing to relieve radial stresses imposed on the annular tread.

7. A method for clamping an annular tread to a casing as in claim 24 wherein the number of clamping points is equal to the number of points where stretching force is applied.

8. An apparatus for clamping an annular tread to a casing, the apparatus comprising:
   a frame;
   a wheel adapted for receiving and mounting a casing, the wheel being mounted on the frame;
   a tread expander assembly, the tread expander assembly being movable along a line coincident with or parallel to the wheel rotational axis, the tread expander assembly having means expandable outwardly and retractable inwardly along the radial direction of the wheel for selectively stretching the tread by radially outward displacement of the tread at a number of spaced points on the radially inner side of the tread, the tread expander assembly being slidable in an axial direction relative to the wheel rotational axis a distance sufficient to align the centerplane of the annular tread with the equatorial plane of the casing; and
   a clamping assembly mounted on the frame, the clamping assembly having a plurality of spaced clamping means for clamping, without rotation of the casing or tread relative to the clamping assembly, the radially outermost surface of the tread at a plurality of spaced points, each point being located between points where the tread expander assembly applied stretching force to the tread.

9. An apparatus for clamping an annular tread to a casing as in claim 8, wherein the clamping means clamps the tread at at least one point located between each set of adjacent points at which the tread expander assembly applies stretching force to the tread.

10. An apparatus for clamping an annular tread to a casing as in claim 8 wherein the clamping assembly includes an annular ring movable to a position radially outward of the annular tread mounted on the tread expander assembly.

11. An apparatus for clamping an annular tread to a casing as in claim 10, which further includes at least one pneumatic cylinder mounted on the annular ring, the pneumatic cylinder or cylinders providing the clamping force for each of the points at which the radially outermost surface of the tread is clamped.

12. An apparatus for clamping an annular tread to a casing as in claim 4, the tread expander assembly having a plurality of axially directed fingers which are extendable and retractable in the radial direction, the fingers being adapted to receive the annular tread, each of the pneumatic cylinders having a pad for contacting the radially outermost surface of the tread at a point between two of the fingers.

13. An apparatus for clamping an annular tread to a casing as in claim 12, the number of pads being equal to the number of fingers.

14. An apparatus for clamping an annular tread to a casing as in claim 12, the pads of the clamping means having spikes.

* * * * *